United States Patent [19]
Niemeyer et al.

[11] Patent Number: 5,897,814
[45] Date of Patent: Apr. 27, 1999

[54] METHOD FOR INJECTION MOLDING OF OPTICAL DISCS

[75] Inventors: Matthew Frank Niemeyer, North Chatham; Charles Edward Baumgartner, Niskayuna, both of N.Y.; Thomas Wayne Hovatter, Newburgh, Ind.; James Paul Gallo, Jr., Clifton Park, N.Y.

[73] Assignee: General Electric Company, Pittsfield, Mass.

[21] Appl. No.: 08/874,235

[22] Filed: Jun. 13, 1997

[51] Int. Cl.⁶ .................................................. B29D 11/00
[52] U.S. Cl. ........................................... 264/1.33; 264/107
[58] Field of Search .................................. 264/1.33, 40.6, 264/106, 107; 249/114.1, 134, 135; 425/810

[56] References Cited

U.S. PATENT DOCUMENTS

| | | |
|---|---|---|
| 4,225,109 | 9/1980 | Yotsutsuji et al. . |
| 4,783,041 | 11/1988 | Sakaida et al. . |
| 5,041,247 | 8/1991 | Kim . |
| 5,124,192 | 6/1992 | Kim et al. . |
| 5,176,839 | 1/1993 | Kim ........................................ 249/135 |
| 5,288,519 | 2/1994 | Baumgartner et al. . |
| 5,290,597 | 3/1994 | Baumgartner et al. . |
| 5,302,467 | 4/1994 | Baumgartner et al. . |
| 5,324,473 | 6/1994 | Baresich . |
| 5,376,317 | 12/1994 | Maus et al. ............................. 264/40.6 |
| 5,388,803 | 2/1995 | Baumgartner et al. .................. 249/135 |
| 5,458,818 | 10/1995 | Kim et al. ............................... 264/1.33 |

FOREIGN PATENT DOCUMENTS

| | | |
|---|---|---|
| 87-180541 | 8/1987 | Japan . |
| 87-5824 | 8/1987 | Japan . |
| 88-71325 | 3/1988 | Japan . |

*Primary Examiner*—Mathieu D. Vargot

[57] ABSTRACT

In a method for controlling the heat transfer in a process for molding an optical disc of the type having a plurality of laser readable depressions of a predetermined quality, the process steps include injecting molten thermoplastic material into a mold having opposing surfaces for replicating respective opposite sides of the disc and imparting optically readable depressions of a predetermined quality to at least one side of said disc, opposing thermally conductive members, and a pair of insulating members, with each insulating member positioned between said conductive mold body and a respective opposing thermally conductive member, maintaining said thermally conductive mold body at a temperature less then about 90 degrees Centigrade wherein said insulting members are selected so that the molten thermoplastic resin is evenly and rapidly cooled from opposing sides to a temperature within about 5 degrees Centigrade of the glass transition temperature of said resin.

8 Claims, 2 Drawing Sheets

METHOD FOR INJECTION MOLDING OF OPTICAL DISCS

FIELD OF THE INVENTION

The present invention relates to a process for molding thermoplastic articles by injecting a plastic into such mold, allowing the mold to cool and ejecting the article from the mold, and more particularly to a process for molding optical and compact discs having reduced birefringence, improved surface replication and improved molding characteristics.

BACKGROUND OF THE INVENTION

Injection molding involves injecting molten thermoplastic resin into a mold apparatus. Molds for injection molding of thermoplastic resin are usually made from metal materials such as iron, steel, stainless steel, aluminum alloy or brass. Such materials are advantageous in that they have high thermal conductivity and thus allow the melt of thermoplastic resin to cool rapidly and shorten the molding cycle time. However, because of the rapid cooling, the injected resin freezes instantaneously at the mold surface, resulting in a thin solid layer. Quick quenching of the melt at the mold surface creates several problems. The freezing of these materials at the mold surfaces creates rough surface. Processing difficulties arise especially when producing thin parts requiring a high quality optical surface. The quick solidification of the melt combined with, for example, variable radial flowability of the materials makes it difficult to achieve the kind of uniform melt flow required for an optical disc. This is important when considering the quality of pits replication required for optical discs. Non-uniform flow can result in areas with high bit errors. The use of multiple gates is not generally thought to be a practical expedient means to remedy non-uniform melt flow in an optical medium, because weld lines are produced which can cause optical flaws.

For a process to be economical, a very careful balance must be maintained between low cycle times and the process parameters to meet the exacting quality standards. Under conventional methods these two production phenomena are usually working in opposition to each other.

Various types of molds have long been in use for preparing shaped articles from thermoplastic resins. Molds for these purposes are typically manufactured from metal or a similar material having high thermal conductivity. For most purposes, high thermal conductivity is desirable since it permits the resin in the mold to cool rapidly, shortening the molding cycle time. At times, however, cooling is so rapid that the resin freezes instantaneously at the mold surface upon introduction into the mold, forming a thin solid layer which, especially if it contains a filler, can create rough surfaces, voids, porosity and high levels of residual stress and orientation. In an optical disc, such imperfections impede the optical properties and decrease or eliminate performance.

There have recently been disclosed multilayer molds in which a metal core has an insulating layer bonded thereto for the purpose of slowing the initial cooling of the resin during the molding operation. The insulating layer is fabricated of material having low thermal diffusivity and conductivity, thus slowing the cooling of the molded resin, and also having good resistance to high temperature degradation, permitting use in a mold maintained at high temperatures. In order to improve the durability of the mold and to improve part surface quality, one or more skin layers of hard material, typically metal, is bonded to the insulating layer. The skin layer may be deposited by such operations as electroless deposition, electrolytic deposition and combinations thereof. Due to the insulation, the skin layer retains heat longer during the molding operation, thereby avoiding the surface irregularities created by rapid surface cooling.

Through thickness birefringence, (i.e., retardation and the influence of molding and specific process conditions on residual retardation or optical path difference) is also a crucial factor to be considered in connection with optical disc manufacturing.

The interrelationship of process conditions, birefringence, and pit replication is highly complex when manufacturing digital audio discs. The retardation profiles are a reliable measure of the effect which process conditions have on final optical properties. Circumferential variations reflect non-uniform heat transfer in the mold. Also, because the polycarbonate must cool against the nickel stamper with precise molding of the pits, heat transfer, here too, is important. Thus, improvement is required to render the heat transfer more uniform.

SUMMARY OF THE INVENTION

Under conventional methods a careful balance must be maintained between low cycle times and exacting quality standards. These two production phenomena are usually working in opposition to each other. As cycle times decrease quality is reduced. The present invention utilizes controlled heat transfer to expand the processing window to increase the flexibility for optimization.

It is an object of the present invention to achieve a balanced heat flow from the cavity area during injection molding by utilizing an insulating barrier in the manufacture high quality media discs, such as, optical discs, compact discs, and computer discs, having improved uniformity of birefringence and improved surface quality which include pit of groove replication.

In accordance with the present invention, there is provided a method for controlling the heat transfer in a process for molding an optical disc of the type having a plurality of laser readable depressions of a predetermined quality wherein the process steps comprise injecting molten thermoplastic material at a temperature from 200 degrees to about 400 degrees Centigrade into a mold having opposing surfaces for replicating respective opposite sides of the disc and imparting optically readable depressions of a predetermined quality to at least one side of said disc, said thermoplastic material having a glass transition temperature of from about 110 to about 175 degrees Centigrade, said mold being of the type having a thermally conductive mold body and opposing thermally conductive members, each member having a respective opposing surface for forming opposite sides of said optical disc, said mold including a pair of insulating members controlling heat transfer from said mold cavity, each insulating member positioned between said conductive mold body and a respective opposing thermally conductive member, maintaining said thermally conductive mold body at a substantially constant temperature of less then about 90 degrees Centigrade wherein said insulting members are selected so that the molten thermoplastic resin is evenly and rapidly cooled from opposing sides to a temperature within about 5 degrees Centigrade of the glass transition temperature of said resin.

According to preferred embodiments, the conductive mold body is maintained at a temperature of from about 30 to about 70 degrees Centigrade, most preferably less than about 60 degrees Centigrade.

DETAILED DESCRIPTION OF THE INVENTION

Figure 1:
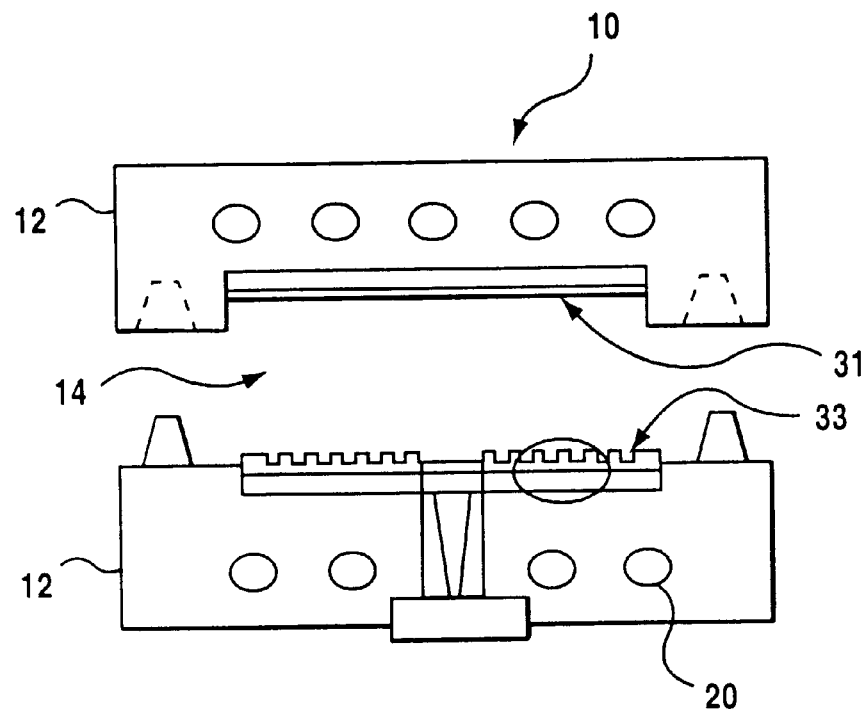
FIG. 1 is a schematic of a side sectional elevation of an embodiment of a molding apparatus for making optical discs.
Figure 2:
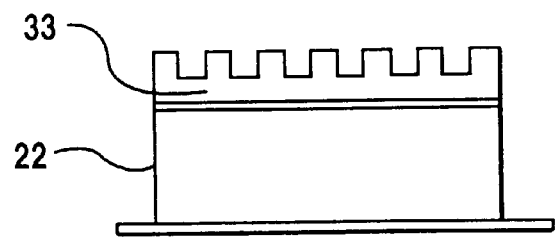
FIG. 2 is a detailed cross sectional view of a portion of the stamper and insulator shown in FIG. 1.

Referring now to the drawings, FIG. 1 shows a mold 10. The mold body 10 comprises two core halves 12 relatively moveable with respect to each other and situated in opposing or confronting relationship so as to form a mold cavity 14 there between. Hot thermoplastic resin is injected from a source (not shown) into the mold cavity via a sprue. After the injection step, the mold halves 12 may be moved relative to each other to further compress and spread the thermoplastic material in the cavity 14. The mold halves 12 are made of a material with a relatively high thermal conductivity such as iron, steel, stainless steel, aluminum alloy or brass. Cooling lines 20 for receiving a cooling fluid are provided in the core halves to reduce cycle time.

A thermal insulating member 22 is disposed on each of the core halves 12. The thermal insulating member 22 is made from a low thermally conductive material, preferably a high temperature polymer. The each member 22 may be in the form of an insulating layer adhered to a respective core half 12 or in the form of a separate and removable insulating member. Typical polymers comprise polyimides, polyamideimides, polyamides, polysulfone, polyethersulfone, polytetrafluoroethylene, polyetherketone, with or without fillers, typically applied in uncured form (e.g., as a polyamic acid in the case of a polyimide or polyamideimide) and subsequently heat cured. Preferably, the insulating layer is flexible film such as a polyimide film manufactured under the trademark KAPTON, from about 1 to about 20 mils, preferably, from about 2 to about 15 mils thick. When the layer is a polyimide, it may be combined with one of several particulate fillers such as glass, $AlSiO_3$, $BASO_4$, $Al2O_3$ etc., or a layer of filled EYMYD polyimide resin coated with a layer of non-filled EYMYD polyimide resin.

A thermally conductive metal member faces the interior of the mold and is directly adjacent to the insulating layer. The metal member may be in the form of a separate layer fixedly attached or removably secured to a respective insulating member. It is contemplated that a pair of stampers may be utilized with each stamper being positioned directly adjacent to a respective insulating member or adjacent to a conductive layer formed on a respective insulating layer. When the conductive member is an adherent metal layer 31, it is desirable that it exhibits good mechanical strength, strong adhesion to the insulating layer 22, good abrasion resistance and high mechanical strength. Other important properties include thermal conductivity and oxidation resistance. In addition, when the surface 31 abuts the rear surface of the stamper, it is desirable to be finished to an optical quality to effect good pit replication.

The conductive member is preferably fabricated from nickel but may also fabricated from carbon steel, stainless steel, aluminum, brass, copper. Metal alloys with a low thermal expansion coefficient, such as Invar ferronickel, can also be used. A metal conductive member in the form of an adherent conductive layer may be referred to as the skin layer which may be electro-deposited, or preferably electroless deposited on the insulating layer 22 as hereafter described.

The stamper 33 has an exposed conductive surface, and may act as the conductive layer obviating the strict need for an additional outer skin layer 31 between the insulator and stamper. If employed, however, the conductive layer protects the insulator from scratches during stamper changes and provides a uniform, highly polished surface for the stamper to seat onto during molding.

As the hot thermoplastic resin 11 is injected into (and if desired, compressed in) the mold cavity 14, heat from the resin is absorbed by the metal conductive member. The insulating member 22 is selected so as to permit quick cooling of the resin while holding the temperature of the resin within about 5 degrees of the glass transition temperature. This results in a thermoplastic adjacent to the stamper surface remaining in a moldable form for a short time period. The opposing metal conductive members cooperate to provide the desired surface quality to the finished part. The optical disc is held in the mold for a time sufficient for the article to cool below the glass transition temperature of the resin, and it is then ejected from the mold.

The insulating members 22 are sufficiently thin to permit rapid cooling of the molten resin to a temperature within about 5 degrees Centigrade of the glass transition temperature to permit a short cycle time. The insulating members are sufficiently thick to permit the molten resin to remain above the glass transition temperature for short period of time, on the order of from 0.001 to about 1.0 seconds to permit good replication of the pits as depressions in the surface of the optical disc. The thickness of the respective insulating layers members are selected so as to achieve a controlled cooling or heat flow from the cavity during molding. Typically, the insulating members have a uniform width dimension with the thickness being utilized within the range from about 0.5 to about 20 mils. When the insulating member is polyimide and polycarbonate is used as the resin, preferred thickness' are from about 1.0 to about 8.0 mils.

Desirably a pair of insulating members are utilized to achieve a balanced heat flow and even cooling from opposite sides of the optical disc for improved birefringence.

When the insulating layer is an insulating resin material, the outer skin layer may be a composite including a primer layer atop the insulation later and a hard metallic layer (e.g., electroless nickel) atop the primer layer. This configuration is discussed in detail in U.S. Pat. No. 5,458,818 to Kim et al.

U.S. Pat. No. 5,388,803 to Baumgartner et al. describes a multilayered insulative mold structure having a skin of a plurality of sublayers where an upper layer is uniformly textured by selective etching down to form a desired texture. In this case, the stamper may be formed as an integral part of the conductive layer.

In order to mold optical surfaces, the skin layer or conductive layer 31 which engages the stamper 33 may be provided with a mirror-surface finish such as a nickel plated copper composite for optical disc (OD) molding or a mirror-surface finish copper clad laminate for compact disc (CD) molding.

To obtain improved pit replication it is desirable to delay the quenching of the surface for a period of time to raise the stamper temperature to a value in the vicinity of the polymer glass transition temperature. This temperature rise allows the melt to conform to the shape of the stamper during packing, and enhance the replication of the pits. The thermal performance criterion is to obtain a peak stamper temperature within 5 degrees Centigrade of the glass transition temperature of the polymer. By controlling heat transfer with the passive thermal insulators applied to the cavity surfaces or mirror blocks on the disc tool, the heat transfer at the surface of the part during the fill and packing stages is controlled to enhance pit replication. The conductive metal layer is maintained above the Tg of the resin for a period of time to enhance pit replication and lower residual stress.

In accordance with the present invention, the thermoplastic material is selected so as to be stable at the high melt temperatures of 200 degrees to 400 degrees Centigrade while having a glass transition temperature within the range of about 110 to about 175 degrees Centigrade. The preferred resin is polycarbonate resin.

According to controlled heat transfer, heat transfer from the centerline of the polymer through the stamper, the insulator, the tool steel and into the cooling water on one side of the disc balances the heat transfer on the other side of the disc through the insulator and associated structure into the cooling water.

As an example, discs were molded on an insulating tool utilizing balanced heat transfer. The column height on the stamper was measured at a radius of 30 and 50 mm from the center of the disc. Samples were molded at tool temperatures of 150 degrees F. (about 65 decrees C.), melt temperature of 620 degrees F. (326 degrees C.), and cycle times of 4.25 seconds. By utilizing managed heat transfer, the pit depth, pit geometry, and pit uniformity was enhanced.

It has been shown that higher melt temperatures and higher mold temperatures reduce birefringence. Injection velocity also impacts birefringence. Higher injection rates reduce birefringence which may be attributed to the temperature rise due to increased melt shear. Packing pressures during solidification of the melt have a profound impact on internal stress. Lowering packing pressure will reduce birefringence.

The correlation between electrical signals and pit replication has been demonstrated. Good pit geometry and depth result in consistent and strong electrical HF signals. Pit replication is improved with high packing and holding pressures, as well as higher mold and melt temperatures. Increased injection velocity also contributes to better pit replication, again most likely related to higher temperatures induced by increased shear.

The primary driver of disc flatness is the balancing of thermally induced stress through the thickness of the disc. The resulting residual stress is a function of temperature, solidification rate, pressure and time. Balanced heat transfer on both mold halves and accurately controlled pressure during solidification are the keys to flat discs. Early removal of the disc from the tool can also contribute to excessive warpage in the disc.

Tool temperature is a significant process parameter which affects cooling time. A lower tool temperature facilitates faster cooling and hence shorter cycle times. Lower melt temperatures can also contribute to shorter cooling times. High tool and melt temperatures positively impact birefringence and pit replication but increase cycle time. High packing pressures increase pit replication but increase birefringence. Increased injection velocity improves pit replication and birefringence but may impact material stability and induce flow irregularities. Ideally the molder is in need of a means to achieve good pit replication at reduced mold and melt temperatures. Surface enhancements also would provide for the reduction of many flow irregularities due to high injection velocity.

One of the major components of the total molding cycle is the cooling time. The colder the mold, the faster the disc will solidify and the sooner the disc can be ejected. But cooler molds can compromise disc quality. Typically, lower mold temperatures reduce surface replication. Colder molds also produce higher thermal gradients in the disc as it cools. This can increase residual stress/strain by quenching in material orientation thus creating higher birefringence through the thickness. Higher stress, if unbalanced, can also cause molded discs to warp. Controlling the heat transfer at the resin/tool interface can impact the relationship between tool temperature, cycle time, surface replication, birefringence, and warpage.

The primary objective of the insulating layer is to control the transient heat transfer of the molten resin at the surface of the disc during the fill and packing stages of injection.

Figure 3:
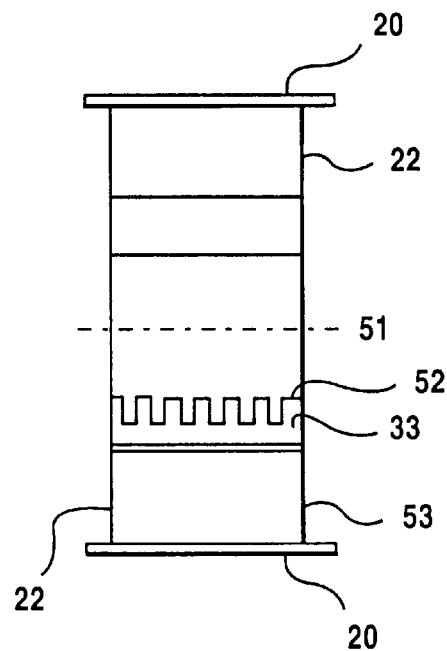
FIG. 3 is a partial cross section of a filled mold showing points for temperature measurement.

A simple one-dimensional cooling analysis is included to clarify the underlying physics. FIG. 3 is a schematic showing the three critical points in the cooling of an optical disc and their respective time/temperature profiles. The centerline 51 of the disc dictates the minimum cooling time for the part to cool below Tg of the thermoplastic resin, preferably a polycarbonate resin. The subsurface temperature of the resin shown at 52 impacts the thermal stress and pit replication on the disc's surface and is measured at the stamper/resin interface. This temperature profile primarily impacts the surface replication. The temperature of the stamper is measure at 52. An additional temperature measurement is the temperature of the mold 12 which is measured at 53. The mold acts as a heat sink and is maintained at a substantially constant temperature according to the preferred embodiments of the present invention.

Figure 4:
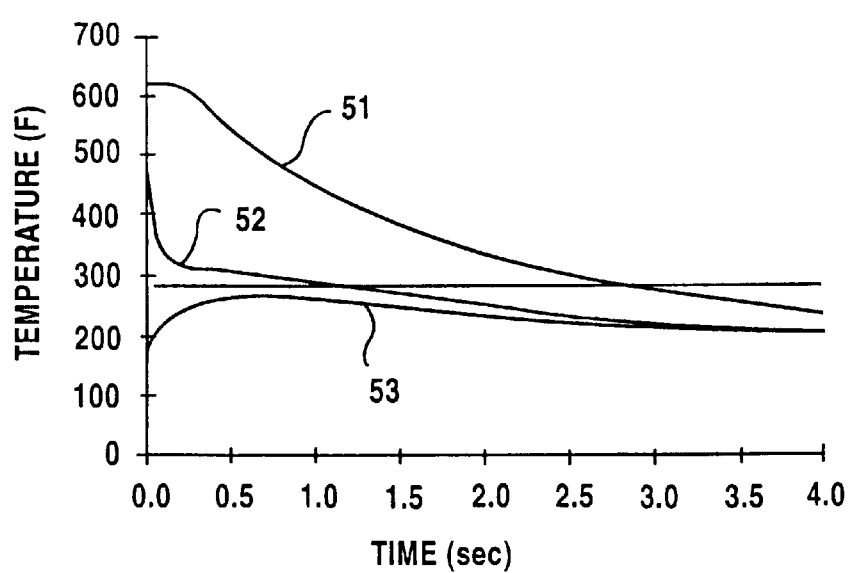
FIG. 4 is a thermal analysis temperature profile for insulated tool.

With rapid quenching of the skin layer, in conventional molding without an insulating layer, the disc surface rapidly drops below the glass transition of the polycarbonate inhibiting relaxation. With an insulating layer, the temperature profile for the insulated tool shown in FIG. 4 demonstrates the critical difference. The subsurface 52 of the molded disc is held above its Tg (glass transition temperature) for approximately one second longer than the conventionally molded disc. Also note the rise in temperature at the stamper/resin interface. This delay in quenching at the surface of the tool produces three benefits: it allows the material to flow more effectively; it allows for more complete replication of the stamper surface; and it enables the visco elastic polycarbonate material to "relax", thus reducing residual strains impacting birefringence.

The trade off with this delay is a slight increase in cooling time which is the time required for the centerline of the disc to drop below Tg. In accordance with the principles of the present invention, the tool temperature of the insulated system is lowered to compensate for any increase in cycle time.

An atomic force microscope (AFM) was used to measure pit and groove depth for both DVD and CD-R formats respectively. An AFM scan of a DVD disc and the location at which the scan was made. A radius of 57 mm was chosen for the measurements of pit depth. The outer radius of a disc typically has the lowest surface replication due to the reduced pressure and flow. Acceptable pit/groove formation here generally means good pit/grooves along the inner radii.

A series of discs (1.2 mm nominal thickness) was molded using a spiral grooved CD-R stamper. Typical mold temperatures for standard CD-R molding range between 220–250° F. (about 104 to 121 decrees C.). The elevated temperatures are required to ensure acceptable levels of groove depth formation. An ICT Axxicon CI tool was configured for standard molding and two MHT configurations, MHT "A" and MHT "B". The same stamper was used for each of the three tool configurations. Mold temperature was varied and grooves were measured for each mold temperature.

An analysis of the results of the test shows the significant dependency of groove depth on tool temperature for the standard molded discs. A 50° F. reduction in the mirror block temperature induces a forty percent reduction in groove depth for the standard tool.

By contrast both controlled heat transfer configurations using insulating materials were molded at all four mirror block temperatures and only the "B" system at 90° F. failed to produce grooves within specification. All other discs molded with controlled heat transfer met groove depth specification even at 150° F. below typical production conditions.

The trade off associated with a thermal insulator coated on the surface of the tool is the impact on bulk cooling. The insulator is engineered to give an optimum temperature rise at the resin/stamper interface and have minimum impact on total cooling time. A series of mirror block temperatures were evaluated with the one-dimensional model and a cooling analysis was run for standard and controlled heat transfer configurations on both 1.2 mm and 0.6 mm discs. The controlled heat transfer curves are shifted slightly higher than their respective standard cooling. The increase in cooling time is anywhere from 0.1 to 0.4 seconds for the 0.6 mm disc and 0.4 to 0.8 seconds for the standard CD-R 1.2 mm disc. However, because controlled heat transfer enables the tool temperature to be reduced significantly, cooling time differences can be reduced, eliminated, or even improved over standard configurations.

An example of this improvement is shown for CD-R. A typical mirror block temperature for CD-R is 240° F. (115 degrees C.) which is required for groove replication for a system not using an insulating layer. A good quality disc can be molded using an insulator material to control heat transfer with a mold temperature of 90° F. (about 32 degrees C.). Matching the cooling profiles for the 1.2 mm disc this represents a theoretical cooling time improvement of approximately 2.0 seconds. Tool temperatures are preferable maintained within the range of about 130 to about 160° F. (about 55 to abut 70 degrees C.).

Birefringence scans for the optimized controlled heat transfer using insulative material discs and the standard molded discs were performed. The total cycle time was constrained at 4.25 seconds. Insulator thickness and tool temperature were optimized with the insulator configuration "A" to produce the birefringence shown. Tool temperature was also optimized for the standard molded disc. No modifications to the injection velocity or hold profile were made. This profile demonstrates the increase in uniformity and the decrease in total birefringence obtainable through use of insulator discs.

Substantial changes in the processing and tool design were required to move from conventional CD-ROM 1.2 mm disc to the 0.6 mm thin disc DVD format. Much of the machine and tooling development continues as more and more converters begin to explore and prepare for the production of this format. Thinner walls dictate higher mold temperatures, faster injection capabilities, injection compression molding techniques, and higher flowing materials.

A similar mold temperature evaluation was run with the CI tool configured for the 0.6 mm thick discs as was run on the CD-R discs. The DVD format was molded at three different tool temperatures, 240° F., 190° F., and 140° F. along with two insulator configurations, "A" and "B". The stamper column height is shown in nanometers. Typical tool temperatures for DVD without an insulating layer are 240° F. (115 degrees C.). All three samples show good pit replications at this temperature. However, as temperature is reduced, pit replication decreases on the standard molded discs. The use of insulators maintained acceptable pit depths down to 100° F. (38 degrees C.).

Similar conclusions can be drawn for pit replication as for the CD-R. The use of insulators opens up the process window where pit replication becomes the limiting factor for process optimization. The ability to reduce mold temperatures also has a positive impact on safety and maintenance in the molding facility.

The reduction of disc thickness for DVD has a major influence on flow induced orientation and the through thickness cooling profiles for the 0.6 mm disc. The cooling takes place in about one-quarter of the time as a 1.2 mm disc for a given temperature. The change in the filling and cooling dynamics affects the resultant birefringence profile. The birefringence seems to become more dominated by the quickly quenched, highly oriented skin layer.

Discs generated at the three different tool temperatures were scanned and birefringence profiles obtained. As the tool temperature is increased, the birefringence, specifically in the inner radii is decreased. The best profile was obtained with the thicker insulator at the highest tool temperature. This is different than the 1.2 mm discs where the lower tool temperature produced the best profile. All other parameters were held constant when tool temperature was varied.

The comparison of optimum results between using insulators and standard molded discs was studied. A substantial improvement over the standard disc using the insulator. Baseline conditions for molding the DVD disc was supplied by both the machine and mold manufacturers. Results shown here represent the general trend expected when using insulators to control heat transfer.

A comparison was made of insulation of only the stamper side of the tool as compared to insulating both sides of the tool as set forth in the present invention. The limiting factor to single side insulation is the ability to balance the heat transfer and cooling profiles on each side of the disc during molding.

Single sided insulation evaluations were completed for two configurations, "A" and "B". Dishing was measured and was used as the primary response attribute. Scans of the 1.2 mm CD-R discs were taken. Temperature offsets between the moving and fixed halves of the tool much larger than 5–10 degrees F. were required to minimize the dishing of the discs. The single sided "A" configuration could not be processed to produce acceptable discs. Single sided "B" were processed close to specification but still were not in range. Both the standard discs and the double sided insulative discs were molded within specification with minimum offsets. Further optimization could be achieved to bring all attributes into specification for a single sided disc.

While there has been described what are at present considered to be the preferred embodiments of the present invention, it will be apparent to those skilled in the art that various changes and modifications may be made therein without departing from the invention, and it is intended in the appended claims to cover such changes and modifications as fall within the spirit and scope of the invention.

What is claimed:

1. A method for controlling the heat transfer in a process for molding an optical disc having a plurality of laser readable depressions of a predetermined quality wherein the process steps comprise injecting molten thermoplastic material at a temperature from 200 degrees C. to about 400 degrees C. into a mold having opposing surfaces for replicating respective opposite sides of the disc and imparting optically readable depressions of a predetermined quality to at least one side of said disc, said thermoplastic material having a glass transition temperature in the range of 110 to about 175 degrees Centigrade, said mold being of the type having a thermally conductive mold body and opposing thermally conductive members, each member having a respective opposing surface for forming opposite sides of said optical disc, said mold including a pair of insulating members, each insulating member positioned between said conductive mold body and a respective opposing thermally conductive member, maintaining said thermally conductive mold body at a temperature less then about 90 degrees Centigrade wherein said insulting members are selected so that the molten thermoplastic resin is evenly and rapidly cooled during injection molding from opposing sides to a temperature within about 5 degrees Centigrade of the glass transition temperature of said resin.

2. A process according to claim 1 wherein said conductive mold body is maintained at a temperature of from about 30 to about 70 degrees Centigrade.

3. A process according to claim 2 wherein said conductive mold body is less than about 60 degrees Centigrade.

4. A process according to claim 1 wherein the thickness of said insulting members is selected so that molten thermoplastic material is evenly and rapidly cooled from both sides to a temperature within about 5 degrees Centigrade of the glass transition temperature of said resin.

5. A process according to claim 1 comprising the steps of retaining said thermoplastic material within the mold for a time sufficient for the material to cool below its glass transition temperature; and ejecting the cooled article from the mold.

6. A process according to claim 2 wherein said thermally conductive member comprises a thin conductive layer on the surface of the insulating member in contact with the stamper.

7. A process according to claim 2 wherein said insulating member comprises a polyimide material.

8. A process according to claim 3 wherein said insulating member is comprised of an insulating resin layer adhered to said mold body.

* * * * *